（12）United States Patent
Hay et al.

(10) Patent No.: US 11,415,033 B2
(45) Date of Patent: Aug. 16, 2022

(54) METHOD FOR OPERATING A PETROL ENGINE, IN PARTICULAR OF A MOTOR VEHICLE, AND MOTOR VEHICLE

(71) Applicant: Daimler AG, Stuttgart (DE)

(72) Inventors: Guenter Hay, Fellbach (DE); Kai Hoffmann, Stuttgart (DE); Tobias Schoeffler, Wernau (DE); Michael Stiller, Remseck (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/979,318

(22) PCT Filed: Mar. 5, 2019

(86) PCT No.: PCT/EP2019/055355
§ 371 (c)(1),
(2) Date: Sep. 9, 2020

(87) PCT Pub. No.: WO2019/170623
PCT Pub. Date: Sep. 12, 2019

(65) Prior Publication Data
US 2021/0003057 A1 Jan. 7, 2021

(30) Foreign Application Priority Data
Mar. 9, 2018 (DE) ..................... 10 2018 001 923.4

(51) Int. Cl.
*F01N 3/00* (2006.01)
*F01N 3/10* (2006.01)
(Continued)

(52) U.S. Cl.
CPC ......... *F01N 3/101* (2013.01); *B01D 53/9454* (2013.01); *F01N 3/225* (2013.01);
(Continued)

(58) Field of Classification Search
CPC ........ F01N 3/101; F01N 13/0093; F01N 3/30; F01N 2430/06; F01N 2560/025;
(Continued)

(56) References Cited

U.S. PATENT DOCUMENTS 4,175,386 A * 11/1979 Katahira ................. F01N 3/222
60/276
4,231,220 A * 11/1980 Takeda ..................... F01N 3/222
60/276
(Continued)

FOREIGN PATENT DOCUMENTS

CN 101351630 A 1/2009
CN 105317511 A 2/2016
(Continued)

OTHER PUBLICATIONS

PCT/EP2019/055355, International Search Report dated Apr. 23, 2019 (Two (2) pages).
(Continued)

*Primary Examiner* — Matthew T Largi
(74) *Attorney, Agent, or Firm* — Crowell & Moring LLP

(57) ABSTRACT

A method for operating a petrol engine, in which air is introduced into an exhaust tract through which exhaust gas from the petrol engine can flow, bypassing the petrol engine, includes introducing the air into the exhaust tract at a point arranged downstream of a first three-way catalytic converter arranged in the exhaust tract and upstream of a second three-way catalytic converter arranged in the exhaust tract downstream of the first three-way catalytic converter, while the petrol engine is operated with a sub-stoichiometric combustion air ratio, where a desulphurization of the second three-way catalytic converter is effected.

9 Claims, 5 Drawing Sheets

(51) Int. Cl.
  *F01N 13/00* (2010.01)
  *B01D 53/94* (2006.01)
  *F01N 3/22* (2006.01)
  *F01N 3/30* (2006.01)

(52) U.S. Cl.
  CPC ........... *F01N 3/30* (2013.01); *F01N 13/0093* (2014.06); *B01D 53/9495* (2013.01); *B01D 2255/904* (2013.01); *F01N 2260/04* (2013.01); *F01N 2430/06* (2013.01); *F01N 2560/025* (2013.01); *F01N 2560/026* (2013.01); *F01N 2560/06* (2013.01); *F01N 2560/14* (2013.01); *F01N 2900/1404* (2013.01)

(58) Field of Classification Search
  CPC ........... F01N 2560/026; F01N 2560/06; F01N 2560/14; F01N 2900/1404; B01D 53/9454; B01D 2255/904
  See application file for complete search history.

(56) References Cited

U.S. PATENT DOCUMENTS

| | | | | |
|---|---|---|---|---|
| 5,517,848 A * | 5/1996 | Hosoya | ............... | F02D 35/0038 73/23.31 |
| 5,974,791 A * | 11/1999 | Hirota | ................ | B01D 53/8696 60/276 |
| 6,227,180 B1 * | 5/2001 | Hoffmann | ................ | F01N 3/32 123/564 |
| 6,722,125 B1 * | 4/2004 | Pfalzgraf | .............. | F01N 13/009 60/295 |
| 9,816,417 B2 * | 11/2017 | Corliss, II | ........... | F02D 41/1441 |
| 2004/0168432 A1 * | 9/2004 | Beylich | ..................... | F01N 3/32 60/289 |
| 2005/0109029 A1 * | 5/2005 | Busch | ..................... | F02B 37/00 60/605.1 |
| 2006/0090455 A1 * | 5/2006 | Wakahara | ............... | F01N 11/00 60/277 |
| 2009/0188240 A1 * | 7/2009 | Suzuki | .................. | F01N 3/0842 60/286 |
| 2016/0025026 A1 * | 1/2016 | Kitaura | ............... | F02D 41/1454 60/276 |
| 2018/0170353 A1 * | 6/2018 | Ulrey | .................. | F02D 13/0257 |

FOREIGN PATENT DOCUMENTS

| | | |
|---|---|---|
| DE | 43 25 202 A1 | 3/1994 |
| DE | 199 33 029 A1 | 1/2001 |
| EP | 3 115 566 A1 | 1/2017 |
| JP | 2000-274232 A | 10/2000 |

OTHER PUBLICATIONS

Chinese-language Office Action issued in Chinese Application No. 201980017355.2 dated Sep. 7, 2021 with English translation (13 pages).

Chinese-language Office Action issued in Chinese Application No. 201980017355.2 dated Mar. 10, 2022 with English translation (14 pages).

* cited by examiner

METHOD FOR OPERATING A PETROL ENGINE, IN PARTICULAR OF A MOTOR VEHICLE, AND MOTOR VEHICLE

BACKGROUND AND SUMMARY OF THE INVENTION

The invention relates to a method for operating a petrol engine, in particular of a motor vehicle. Furthermore, the invention relates to a motor vehicle.

Such a method for operating a petrol engine, in particular of a motor vehicle, and a motor vehicle having such a petrol engine are already sufficiently known from the general prior art. In the method, air is introduced into an exhaust tract through which exhaust gas from the petrol engine can flow, bypassing the petrol engine, such that the air is fed or introduced into the exhaust gas flowing through the exhaust tract. This introduction of air is also referred to as secondary air injection, wherein the air bypasses the petrol engine, in particular its combustion chambers which are designed as cylinders, for example. This means that the air does not flow through the petrol engine or its combustion chambers, but rather the air flows past the petrol engine or its combustion chambers and flows into the exhaust tract, in particular without participating in combustion processes taking place in the combustion chambers. Although a secondary air injection supports oxidation of hydrocarbons (HC) and carbon monoxide (CO) in the catalytic converters in the exhaust tract, it does not lead to a desulphurization of a three-way catalytic converter.

In addition, DE 199 33 029 A1 discloses a method for desulphurizing an $NO_x$-storage catalytic converter in an exhaust system of an internal combustion engine with direct injection.

Sulfurs in the fuel, in particular in odorized gas and lubricants such as motor oil, lead to poisoning of a three-way catalytic converter. In the lower temperature range, the three-way catalytic converter absorbs the sulphur. For desulphurization or desulphurizing, a relatively high exhaust gas temperature is required, which is not present in efficient engines and at low load. In applications with two three-way catalytic converters, in which a first three-way catalytic converter is mounted close to the engine for a quick light-off in a cold start and a second three-way catalytic converter is mounted on the underbody or, in commercial vehicles, at a certain distance from the engine on the vehicle frame, the exhaust gas temperature in the second catalytic converter is often insufficient to achieve a sufficient desulphurization of the three-way catalytic converter.

The object of the present invention is to develop a method and a motor vehicle of the type mentioned above in such a way that a particularly low-emission operation can be guaranteed.

In order to develop a method of the type specified herein in such a way that particularly low-emission operation can be guaranteed, it is provided in accordance with the invention that the air is introduced into the exhaust tract at at least one point located downstream of a first three-way catalytic converter located in the exhaust tract and upstream of a second three-way catalytic converter located in the exhaust tract downstream of the first three-way catalytic converter, while the petrol engine, in particular in its fired mode, is operated with a sub-stoichiometric combustion air ratio, whereby desulphurization of the second three-way catalytic converter is caused. This means that the point at which the air is introduced into the exhaust tract, bypassing the petrol engine, in particular bypassing its combustion chambers which are designed as cylinders, for example, is arranged downstream of the first three-way catalytic converter and upstream of the second three-way catalytic converter, which is arranged downstream of the first three-way catalytic converter. The aforementioned fired operation of the petrol engine is in particular to be understood to mean that combustion processes take place in the petrol engine, in particular in its combustion chambers, by means of which combustion processes an output shaft, designed for example as a crankshaft, of the petrol engine, also referred to as an internal combustion engine or combustion engine, is driven. This fired operation is, within the scope of the method according to the invention, a sub-stoichiometric and thus a rich operation, which is also referred to as rich operation. Sub-stoichiometric operation or sub-stoichiometric combustion air ratio, which is also referred to as lambda, is to be understood to mean that the combustion air ratio is less than one. Thus for the operation of the petrol engine with sub-stoichiometric combustion air ratio, $\lambda<1$ applies.

This in turn means that an amount of air introduced into the petrol engine, in particular into its combustion chambers, during fired operation is less than is required for the complete combustion of fuel which is also introduced into the petrol engine, in particular into its combustion chambers, during fired operation. Thus the air introduced into the petrol engine is combusted with a first part of the fuel introduced into the petrol engine. Due to the sub-stoichiometric combustion air ratio, a second part of the fuel introduced into the petrol engine which differs from the first part is not combusted, but is instead discharged from the petrol engine, for example uncombusted, such that, for example, the second part, which comprises uncombusted hydrocarbons (HC), enters the exhaust tract and flows through it, for example. The uncombusted second part of the fuel can then react or combust in the three-way catalytic converter, for example with the air which has been introduced into the exhaust tract at the aforementioned point, bypassing the petrol engine, in particular its combustion chambers, whereby a particular high temperature, in particular of the exhaust gas, can be brought about in the exhaust tract. As a result, a particularly high temperature can be implemented in the second three-way catalytic converter, whereby the second three-way catalytic converter can be desulphurized particularly advantageously. The desulphurization of the second three-way catalytic converter is also referred to as desulphurizing, wherein, for example, an amount of sulphur initially contained in the second three-way catalytic converter is at least reduced in the course of the desulphurization. In other words, in the course of desulphurization, for example, the second three-way catalytic converter is at least partially freed of sulphur or purified. Again expressed in other words, sulphur is at least partially removed from the second three-way catalytic converter during desulphurization.

Since the point, which is also referred to as the introduction point or entry point, at which the air is introduced into the exhaust tract, bypassing the petrol engine, is arranged downstream of the first three-way catalytic converter and upstream of the second three-way catalytic converter, the air, which is also known as secondary air and is introduced into the exhaust tract at the aforementioned point bypassing the petrol engine, combusts or reacts downstream of the first three-way catalytic converter and not upstream of the first three-way catalytic converter and also not in the first three-way catalytic converter with the uncombusted second part, i.e., with the uncombusted fuel, such that, for example, excessively high temperatures of the first three-way catalytic converter and thus temperature-related damage to the first three-way catalytic converter can be avoided.

The introduction of air into the exhaust tract, as described above, and thus into the exhaust gas flowing through the exhaust tract at the aforementioned point is also referred to as secondary air injection (SAI), during which the air bypasses the petrol engine, in particular its combustion chambers, and is introduced into the exhaust tract and thus into the exhaust gas at the aforementioned point. The feature that the air bypasses the petrol engine or its combustion chambers during secondary air injection is to be understood in particular to mean that the air which is introduced into the exhaust tract at this point does not flow through the petrol engine or its combustion chambers and thus does not participate in combustion processes taking place in the petrol engine, but rather the secondary air flows past the petrol engine or its combustion chambers and into the exhaust tract at this point.

Preferably, the petrol engine, in particular its fired mode, is supplied during the method according to the invention with a gaseous fuel such as CNG (Compressed Natural Gas), LNG (Liquefied Natural Gas) or LPG (Liquefied Petroleum Gas), wherein the fuel, which is in particular gaseous, is introduced in a gaseous state into the petrol engine or its combustion chambers, in particular directly injected. Thus the petrol engine is preferably a gas engine or is operated as a gas engine in the method according to the invention. Naturally, the petrol engine can also be operated as a gasoline engine in the method according to the invention.

The invention is based in particular on the knowledge that sulphur, which can be contained in the fuel for operating the petrol engine, in particular in the fired operation, can impair in particular the second three-way catalytic converter, in particular with regard to its ability to convert uncombusted hydrocarbons (HC) and methane ($CH_4$), i.e., to convert them into carbon dioxide and water, for example. Sulphur contained in the fuel can be deposited in the three-way catalytic converter and thereby on the three-way catalytic converter, and can impair the conversion of HC and $CH_4$ in particular. A further recognition of the invention is that the ability of the three-way catalytic converter to convert components contained in the exhaust gas, such as combusted hydrocarbons and methane, for example, can be restored by a high temperature after the three-way catalytic converter has been sulphurized. Sulphurization means in particular that the three-way catalytic converter contains sulphur which has been deposited on the three-way catalytic converter. By means of a sufficiently high temperature of the three-way catalytic converter, at least a part of the sulphur contained in the three-way catalytic converter can be removed from the three-way catalytic converter such that the latter can again sufficiently convert exhaust gas components such as, in particular, combusted hydrocarbons and methane. Since the point is now arranged downstream of the first three-way catalytic converter and upstream of the second three-way catalytic converter, excessively high temperatures of the first three-way catalytic converter resulting from secondary air injection can be avoided there. In addition, it was found that, in exhaust gas catalytic converters designed as three-way catalytic converters, for example, from or for petrol engines, increasing sulphur loading can lead on one hand to a reduction of the catalytic efficiency and on the other hand to a reduction of the ideal or advantageous combustion air ratio, in particular with regard to a desired combustion air ratio of one, since such a combustion air ratio of one can ensure a particularly advantageous conversion. In the case of natural gas or CNG in particular, sulphur compounds are added as odorants for safety reasons. Such sulphur compounds or sulphur are/is a so-called catalytic converter poison, since sulphur negatively affects the ability of the three-way catalytic converter to convert components contained in the exhaust gas. However, the catalytic converter poison can be released from the three-way catalytic converter during operation by sufficiently high temperatures of, for example, 600 degrees Celsius or more, whereby the catalytic properties of the three-way catalytic converter can again reach an original new state. Furthermore, low concentrations of sulphur are contained in lubricants, such that sulphur can enter the exhaust gas via combustion chambers, exhaust turbochargers, valve stem seals and blow-by, for example.

With petrol engine combustion, a sufficiently high exhaust gas temperature can usually be achieved with a late combustion position and a catalytic converter close to the engine, such that regeneration is possible during driving operation. Regeneration is to be understood as the at least partial desulphurization of the catalytic converter, in particular the three-way catalytic converter. In addition, a poor/rich strategy can usually achieve a sufficiently high temperature in the catalytic converter. With increasing efficiency, low-load driving cycles and in particular in commercial vehicle applications where, for example, an exhaust gas aftertreatment system comprising the aforementioned three-way catalytic converters cannot be arranged close to the engine, i.e., sufficiently close to the combustion engine, due to their size, a temperature of more than 600 degrees Celsius is often not representable. However, the disadvantages and problems mentioned above can now be avoided due to the method according to the invention.

It has proved to be particularly advantageous if a degree of sulphurization of the second three-way catalytic converter characterizing a quantity of sulphur contained in the second three-way catalytic converter is determined, in particular calculated. The degree of sulphurization can be determined, in particular calculated, and preferably monitored, for example by means of a calculation model also referred to as a catalytic converter model, wherein the calculation model is stored, for example, in a storage device of an electronic calculation device. The electronic calculating unit is also referred to as a control unit, wherein the degree of sulphurization is calculated, for example, by means of the control unit. By taking into account the degree of sulphurization during desulphurization of the second three-way catalytic converter, it is possible, for example, to avoid unnecessary or unnecessary desulphurization processes during which the second three-way catalytic converter is desulphurized in each case. In particular, the second three-way catalytic converter can thereby be desulphurized only when it is really necessary. By way of example, a desulphurization mode or desulphurization process in which the second three-way catalytic converter is desulphurized in the manner described is in particular only carried out when the degree of sulphurization exceeds a pre-defined threshold value. According to the invention, it is thus provided that the desulphurization process or desulphurization mode described above is carried out, during which the air is introduced into the exhaust tract at the point bypassing the petrol engine, and the petrol engine is operated with a sub-stoichiometric combustion air ratio. In this way, the second three-way catalytic converter is desulphurized.

A further exemplary embodiment is characterized in that the introduction of air, i.e., secondary air injection, sets a stoichiometric combustion air ratio in the exhaust gas tract upstream of the first three-way catalytic converter and upstream of the second three-way catalytic converter. This means that although the petrol engine is operated with a sub-stoichiometric combustion air ratio ($\lambda<1$), the secondary air injection in the exhaust tract downstream of the first three-way catalytic converter and upstream of the second three-way catalytic converter sets a combustion air ratio of one ($\lambda=1$). In order to conceptually and clearly distinguish in the following the sub-stoichiometric combustion air ratio with which the petrol engine is operated, in particular during its operation, from the combustion air ratio which is set to one by the secondary air injection in the exhaust tract downstream of the first three-way catalytic converter and upstream of the second three-way catalytic converter, the sub-stoichiometric combustion air ratio with which the petrol engine is operated is referred to in the following as the first combustion air ratio, and the combustion air ratio which is set by the secondary air injection in the exhaust tract is referred to as the second or further combustion air ratio. Thus, for example, while the first combustion air ratio is less than one, the second combustion air ratio is at least substantially equal to one.

The second combustion air ratio is formed in particular by the second part of the fuel described above and by the secondary air or its quantity, such that, for example, the quantity of the secondary air is just or exactly sufficient to combust the second part contained in the exhaust tract, in particular downstream of the first three-way catalytic converter and upstream of the second three-way catalytic converter, or uncombusted fuel contained in the exhaust tract, in particular downstream of the first three-way catalytic converter and upstream of the second three-way catalytic converter. The uncombusted fuel contained in the exhaust tract, in particular downstream of the first three-way catalytic converter and upstream of the second three-way catalytic converter, combusts with the secondary air, for example, in the course of an exothermic reaction which is brought about, for example, by the second three-way catalytic converter and takes place therein. In this way, a sufficiently high temperature for desulphurization of the second three-way catalytic converter can be achieved. Since, in addition, the second combustion air ratio is set as a stoichiometric combustion air ratio, the second three-way catalytic converter can ensure a particularly advantageous after-treatment of the exhaust gas, such that a particularly low-emission operation can be represented.

A further exemplary embodiment is characterized in that the air described above or the quantity of air introduced into the petrol engine and, in particular, which participates in the combustion processes taking place in the petrol engine during fired operation, and the fuel or the quantity of fuel introduced into the petrol engine, in particular into its combustion chambers, are determined, in particular calculated and/or detected. The quantity of air introduced into the petrol engine is also referred to as the air quantity, wherein the quantity of fuel introduced into the petrol engine is also referred to as the fuel quantity. The air quantity is measured, for example, by means of an air mass meter, in particular by means of a hot film air mass meter, or a differential pressure measurement by means of a venturi. Alternatively or additionally, the air quantity is calculated, for example, in particular by means of a calculation model. The fuel quantity is calculated, for example, in particular by means of a characteristic map. Here, the first combustion air ratio with which the petrol engine is operated is pre-controlled depending on the determined air quantity and depending on the determined fuel quantity.

It has proved to be particularly advantageous if at least one lambda probe arranged upstream of the first three-way catalytic converter and designed, for example, as a broadband lambda probe, is used to detect at least one value characterizing a residual oxygen content in the exhaust gas, wherein the combustion air ratio, with which the petrol engine is operated, initially set depending on the determined air quantity and depending on the determined fuel quantity, is corrected depending on the determined value. In this way, the combustion air ratio can be set particularly advantageously, such that low-emission and low fuel consumption operation can be ensured.

In order to be able to introduce the secondary air into the exhaust tract particularly precisely, in particular to meter it is, it is provided in a further embodiment of the invention that the secondary air is introduced or fed into the exhaust tract via an air duct which is different from and fluidically connected to the exhaust tract. A temperature of the air in the air duct in thus detected by means of a temperature sensor, wherein a quantity of the secondary air to be introduced into the exhaust tract is set depending on the detected temperature.

A further embodiment is characterized in that, by means of a lambda probe arranged downstream of the second three-way catalytic converter, at least one residual oxygen value characterizing a residual oxygen content in the exhaust gas is detected, wherein a quantity of secondary air to be introduced into the exhaust tract is set depending on the detected residual oxygen value. In this way, the quantity of secondary air can be set particularly precisely, such that particularly low-emission operation can be achieved. It can be seen that the value described above characterizes the residual oxygen content which the exhaust gas has upstream of the first three-way catalytic converter, wherein the residual oxygen value characterizes the residual oxygen content which the exhaust gas has downstream of the second three-way catalytic converter.

In order to be able to desulphurize the second three-way catalytic converter particularly advantageously and thus ensure particularly low-emission operation, it is provided in a further embodiment of the invention that at least one nitrogen oxide value characterizing a nitrogen oxide content in the exhaust gas is detected by means of a nitrogen oxide sensor arranged downstream of the second three-way catalytic converter. A nitrogen oxide sensor is physically based on a lambda probe and supplies a value for the residual oxygen present in the exhaust gas in addition to a nitrogen oxide value. This allows the mixture to be precisely set according to the secondary air quantity. Furthermore, the engine can be operated closer to the limit of lambda $\lambda=1$, without the nitrogen oxide conversion significantly declining. A poorer conversion would be detected by the sensor and the control system would in turn correct the engine more into rich. A methane conversion is particularly good in this range.

Finally, it has proved to be particularly advantageous if in order to desulphurize the second three-way catalytic converter, a temperature of at least 600 degrees Celsius or preferably more is effected in the second three-way catalytic converter.

A motor vehicle, which is designed to carry out a method according to the invention, also belongs to the invention. Advantages and advantageous designs of the method according to the invention are to be regarded as advantages and advantageous designs of the motor vehicle according to the invention and vice versa. Preferably, the motor vehicle is designed as a commercial vehicle.

Further advantages, features and details of the invention emerge from the following description of preferred exemplary embodiments and from the drawings. The features and combinations of features mentioned above in the description and the features and combinations of features mentioned below in the drawing descriptions and/or shown in the Figures alone can be used not only in the combination indicated in each case, but also in other combinations or on their own without leaving the scope of the invention.

DETAILED DESCRIPTION OF THE DRAWINGS

Figure 1:
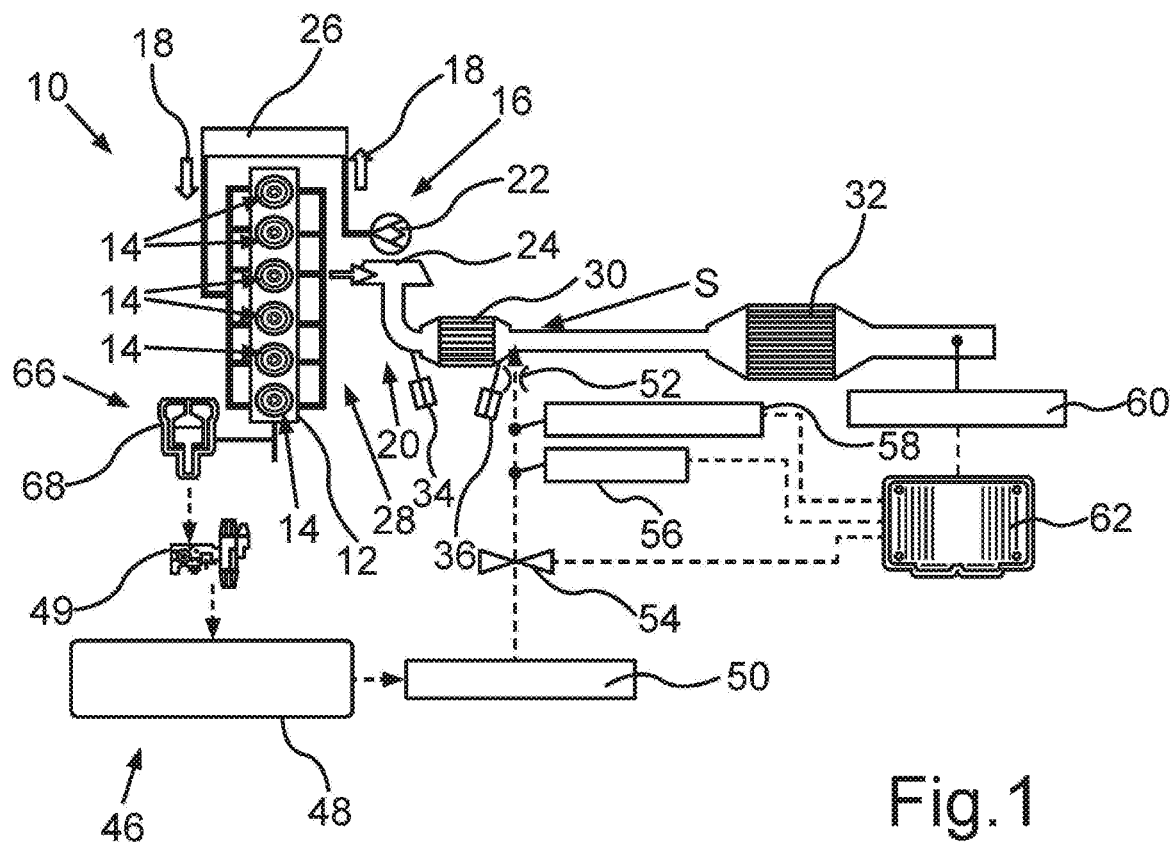
FIG. 1 is a schematic depiction of a petrol engine designed to carry out a method in accordance with the invention according to a first embodiment.

FIG. 1 shows a schematic depiction of a petrol engine 10 of a motor vehicle, in particular a commercial vehicle. The petrol engine 10 is operated by means of a method which is explained in more detail below. The petrol engine 10 has an engine housing 12 in the form of a cylinder housing, by which several, in particular all, combustions chambers 14 of the petrol engine 10 are limited. The petrol engine 10 is also referred to in the following as an internal combustion engine, engine or combustion engine. Furthermore, the combustion chambers 14 are preferably designed as cylinders. As can be seen from FIG. 1, the petrol engine 10 is designed as a six-cylinder in-line engine, for example. The petrol engine 10 also has an output shaft, which cannot be seen in the Figures and is preferably designed as a crankshaft, via which the petrol engine 10 can provide torque to drive the vehicle. The petrol engine 10 has an intake tract 16 through which air can flow and through which—as illustrated in FIG. 1 by the arrows 18—air, also referred to as combustion air, can flow or does flow during the process. The combustion air is conducted by means of the intake tract 16 to and in particular into the combustion chambers 14 and thus into the petrol engine 10, such that the combustion air does not bypass the petrol engine 10, but is instead introduced into the petrol engine 10. In particular, in fired operation or during fired operation of the petrol engine 10, the combustion air is introduced into this or its combustion chambers 14.

In addition, the petrol engine 10 comprises an exhaust gas turbocharger 20, which has a compressor 22 arranged in the intake tract 16 and a turbine 24. By means of the compressor 22, the combustion air flowing through the intake tract 16 is compressed. Due to the compressing, the combustion air is heated. In order to still implement a particularly high degree of charging, a charge air cooler 26 is arranged in the intake tract 16 downstream of the compressor 22 and upstream of the combustion chambers 14, by means of which charge air cooler the compressed combustion air is cooled.

The petrol engine 10 also has an exhaust tract 28, also referred to as an exhaust system, through which exhaust gas from the petrol engine 10, i.e., exhaust gas from the combustion chambers 14, can flow or flows. The turbine 24 can be driven in the exhaust tract 28 and can be driven by the exhaust gas flo % ing through the exhaust tract 28. Since the compressor 22 is driven by the turbine 24 and the turbine 24 is driven by the exhaust gas flowing through the exhaust tract 28, energy contained in the exhaust gas is used to compress the air.

During the method and in particular during the fired operation, the petrol engine 10, in particular the combustion chambers 14, are supplied with a fuel to operate the petrol engine 10. The preferably gaseous fuel is thus introduced into the petrol engine 10, in particular into the combustion chambers 14. In particular, the fuel is injected or blown directly into the petrol engine 10, in particular into the combustion chambers 14. This results in a respective fuel-air-mixture emerging in the petrol engine 10, in particular in the respective combustion chamber 14, during the fired operation, the mixture then being ignited, in particular by spark ignition, and thereby combusted. The fuel-air-mixture comprises at least the fuel which is introduced into the petrol engine 10, and the combustion air which is introduced into the petrol engine 10.

In the method, a so-called secondary air injection is carried out. During the secondary air injection, air is introduced, in particular fed, into the exhaust tract 28, bypassing the petrol engine 10, i.e., bypassing the combustion chambers 14. The air, which bypasses the petrol engine 10, in particular all combustion chambers of the petrol engine 10, and is introduced into the exhaust tract 28, bypassing the petrol engine 10 or bypassing the or all combustion chambers 14 of the petrol engine 10, is also referred to as secondary air. The feature that the secondary air bypasses the petrol engine 10 or its combustion chambers 14 is to be understood to mean that the secondary air does not flow through the combustion chambers 14 and thus does not participate in the combustion processes taking place in the petrol engine 10. The secondary air thus differs from the combustion air in particular in that the secondary air does not flow through the combustion chambers 14, wherein the combustion air is introduced into the combustion chambers 14.

In order to be able to implement particularly low-emission operation of the petrol engine 10, a first three-way catalytic converter 30, also referred to as a pre-catalytic converter or pre-cat, and a second three-way catalytic converter 32, also referred to as a main cat or main catalytic converter, are arranged in the exhaust tract 28, wherein the exhaust gas can or does flow through the three-way catalytic converters 30 and 32. Here, the three-way catalytic converters 30 and 32 are arranged downstream of the turbine 24, wherein the main catalytic converter is arranged downstream of the pre-catalytic converter. The exhaust gas flowing through the exhaust tract 28 thus first flows through the pre-catalytic converter and then through the main catalytic converter. During the process, the air is introduced or fed into the exhaust tract 28 and thus into the exhaust gas flowing through the exhaust tract 28 at a point S, also referred to as the introduction point or the entry point, wherein the point S is arranged downstream of the pre-catalytic converter and upstream of the main catalytic converter in the direction of flow of the exhaust gas flowing through the exhaust tract 28. Preferably, the point S is arranged closer to the pre-catalytic converter than to the main catalytic converter with respect to the direction of flow of the exhaust gas flowing through the exhaust tract 28. By carrying out the secondary air injection, in the course of which the secondary air is introduced at the point S into the exhaust tract 28, a desulphurisation of the second three-way catalytic converter 32 (main catalytic converter) is effected. In the desulphurisation process, the main catalytic converter is desulphurized. This means that at least a part of the sulphur initially present in the main catalytic converter is detached from the main catalytic converter and subsequently removed. During the process, the secondary air injection is carried out, i.e., during the process, the secondary air is injected into the exhaust tract 28 at the point S, while the petrol engine 10 is operated with a sub-stoichiometric, i.e., rich combustion air ratio. In other words, a rich operation of the petrol engine 10, also known as rich operation, is carried out during the secondary air injection, such that the respective fuel-air mixture, which is formed in the respective combustion chamber 14 during fired operation, is a rich mixture.

With the secondary air injection, the fuel-air mixture is stoichiometrically set to lambda $\lambda=1$. If the fuel-air mixture is too poor desulphurisation would not take place, whereas a fuel-air mixture which is too rich leads to the formation of hydrogen sulphide. The combustion air ratio, also referred to as lambda, must be conducted within an extremely small corridor. Here, the combustion air ratio with which the petrol engine 10 is operated should not be less than 0.95 and not greater than 1.0.

The desulphurisation of the main catalytic converter can be effected, for example, from a certain temperature of the main catalytic converter or in the main catalytic converter and thus, for example, from a certain temperature of the exhaust gas, wherein this certain temperature is, for example, at least 600 degrees Celsius or more. This certain temperature is also referred to as the regeneration temperature, as the desulphurisation can also be referred to as regeneration. The maximum permissible engine outlet temperature at which the exhaust gas flows out of the combustion chamber, for example, the maximum possible exothermic effect caused by uncombusted hydrocarbons contained in the exhaust tract 28, for example in the main catalytic converter, and a distance between the main catalytic converter and the pre-catalytic converter, in particular in the direction of flow of the exhaust gas, determine the actual regeneration temperature which is at least necessary for the desulphurisation of the main catalytic converter. The above-mentioned distance between the three-way catalytic converters 30 and 32, also referred to as catalytic converters, runs in the direction of flow of the exhaust gas flowing through the exhaust tract 28, wherein the distance and, if appropriate, the flow guidance define any temperature loss and any damping of maximum temperature peaks by increased thermal inertia. Preferably, pipes of the exhaust tract 28, through which the exhaust gas can flow, and the catalytic converters are thermally insulated in order to keep heat losses as low as possible.

By way of example, if the secondary air injection is carried out at a point upstream of the pre-catalytic converter, the secondary air injection during a cold start or during a warm-up phase of the internal combustion engine following a cold start of the internal combustion engine is not suitable, for example, for desulphurizing the main catalytic converter.

By way of example, if the petrol engine 10 is operated richly, i.e., the combustion air ratio with which the petrol engine 10 is operated in its fired mode is a sub-stoichiometric combustion air ratio of less than one, not all the fuel introduced into the petrol engine 10 will be combusted in the petrol engine 10 or the engine housing 12, but only a first part of the fuel introduced into the petrol engine 10 will be combusted in the petrol engine 10. A second part of the fuel, different from the first part, is not combusted in the petrol engine 10 and thus represents an uncombusted fuel which comprises uncombusted hydrocarbons and enters the exhaust tract 28 in the uncombusted state. If secondary air injection now takes place upstream of the pre-catalytic converter and downstream of the combustion chambers 14, the second part of the fuel or the uncombusted fuel contained in the exhaust tract 28 is combusted with the secondary air upstream of and/or in particular in the pre-catalytic converter, whereby the pre-catalytic converter is subjected to high thermal stress.

However, since it is now provided in the petrol engine 10 shown in FIG. 1 that the secondary air injection takes place at the point S arranged between the catalytic converters, the second part of the fuel contained in the exhaust tract 28 downstream of the pre-catalytic converter or the uncombusted fuel contained in the exhaust tract 28 is combusted with the secondary air before and/or in particular in the main catalytic converter, whereby thermal overloading of the pre-catalytic converter is avoided and the main catalytic converter can be desulphurized particularly advantageously. In other words, in order to implement a main catalytic converter temperature sufficient for desulphurisation, the combustion air ratio, also referred to as the engine lambda, with which the petrol engine 10 is operated in its fired mode, is reduced in comparison with a previous mode and is thus set to less than one. The engine lambda is also referred to in the following as the first combustion air ratio. In order to be able to ensure particularly low-emission operation, a stoichiometric combustion air ratio is set in the exhaust tract 28 downstream of the first three-way catalytic converter and upstream of the second three-way catalytic converter by introducing the secondary air, wherein the combustion air ratio set by introducing the secondary air is also referred to as the second combustion air ratio. Thus, for example, after the pre-catalytic converter, there is a stoichiometric combustion air ratio in the form of the second combustion air ratio despite the rich operation of the petrol engine 10.

The second combustion air ratio is formed in particular by the uncombusted fuel contained in the exhaust tract 28 and by the secondary air, such that the secondary air and the uncombusted fuel form a mixture which is converted exothermically by the main catalytic converter and in particular in the main catalytic converter. This results in a particularly high temperature in the main catalytic converter, in particular in its substrate. In this way, such a high temperature can be set in the main catalytic converter that the main catalytic converter is desulphurized. The desulphurisation is then possible, for example, as soon as the engine has warmed up or when the catalytic converters have reached their start-up temperature which is also referred to as light-off temperature.

The introduction of the secondary air into the exhaust tract 28 is also referred to as metering or air metering, for example. By way of example, the air metering is designed for a required or advantageous temperature increase. Minimal fluctuations and tolerances are covered by a target temperature range. Once the secondary air injection has been switched on and the rich operation of the combustion engine has been activated, a temperature increase occurs in the main catalytic converter, in particular after a delay. A period of time, during which the secondary air is injected into the exhaust tract 28 and the petrol engine is operated with a sub-stoichiometric combustion air ratio and with rich operation, depends, for example, on a degree of sulphurization of the main catalytic converter, wherein, for example, a state of the main catalytic converter is monitored by means of a calculation model also referred to as calculation catalytic converter model. The calculation model, which is also simply referred to as a model, triggers the desulphurisation of the main catalytic converter, for example, and monitors its execution or the aforementioned duration. If desulphurisation is interrupted prematurely, for example by switching off the engine and/or by some other fault, a repeat of the desulphurisation is triggered after a restart.

By way of example, a quantity of combustion air and a quantity of fuel which is introduced into the respective combustion chamber 14 during fired operation is determined, in particular calculated and/or detected. By way of example, the engine lambda is set depending on the determined quantity of combustion air, also referred to as the air quantity, and depending on the quantity of fuel, also referred to as the fuel quantity, which is introduced into the petrol engine 10 during fired operation, and in particular corrected by means of a lambda probe 34 arranged upstream of the pre-catalytic converter. By way of example, the lambda probe 34 and a second lambda probe 36 are arranged [in] the exhaust tract 28, wherein the lambda probe 34 is arranged downstream of the combustion chambers 14 and upstream of the pre-catalytic converter, and the lambda probe 36 is arranged upstream of the main catalytic converter and downstream of the pre-catalytic converter. The lambda probe 34 is designed as a broadband lambda probe, for example, wherein the lambda probe 36 is designed as a jump lambda probe, for example. In particular, the engine lambda, which is set, in particular pre-set, depending on the determined air quantity and depending on the determined fuel quantity, is corrected using the lambda probe 34. In the process, for example, the lambda probe 34 detects at least one value characterising a residual oxygen content in the exhaust gas, wherein the engine lambda, which is initially set depending on the determined air quantity and depending on the determined fuel quantity, is corrected depending on the determined or detected value. By means of the jump lambda probe the stoichiometric mixture, for example, can be subsequently corrected in the per mil range, and in addition, the oxygen storage capacity of the respective catalytic converter of the respective catalytic converter can be monitored. If, for example, the secondary air injection is carried out, the jump lambda probe is deactivated and, with reference to the lambda probes 34 and 36, only the lambda probe 34 is used, for example, in particular to set the engine lambda, in particular to less than one.

Figure 2:
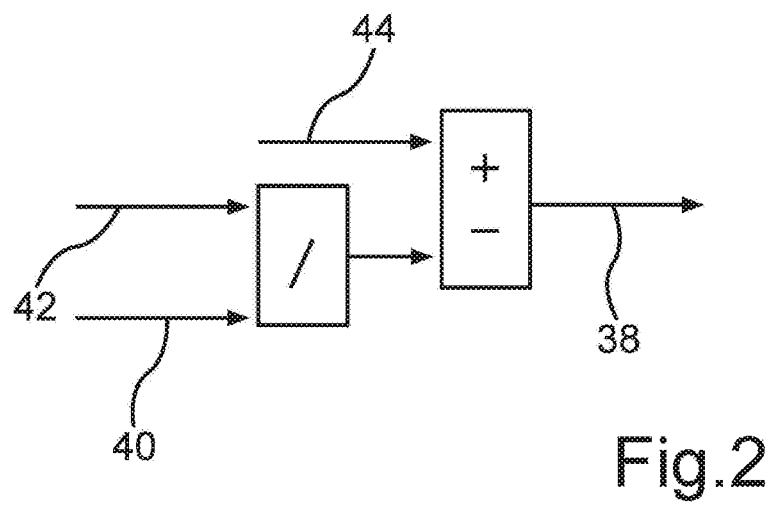
FIG. 2 is a diagram illustrating the method according to the invention.

The engine lambda, which is preferably less than one, is also referred to as the target lambda and is illustrated, for example, by an arrow 38 in FIG. 2. FIG. 2 illustrates the previously described correction of the engine lambda. An arrow 40 illustrates the air quantity, also referred to as air mass, wherein an arrow 42 illustrates the amount of secondary air. Furthermore, an arrow 44 illustrates the stoichiometric combustion air ratio. FIG. 1 shows a first embodiment of the petrol engine 10 and thus the method. In conjunction with FIGS. 3 and 4, a device 46 can be seen, by means of which the secondary air injection is carried out. By way of example, the device 46 comprises a pneumatic air circuit of a commercial vehicle or heavy goods vehicle, by means of which the secondary air can be introduced into the exhaust tract 28. By way of example, the motor vehicle comprises a pressure tank 48, in which the secondary air to be introduced into the exhaust tract 28 is stored, for example at a pressure of approximately 7.5 bar. The pressure tank 48 is known to be filled with compressed air via a piston compressor 68 driven by the internal combustion engine 10, in particular an air compressor, and a pressure reducer 49. By way of example, the secondary air is taken from the tank 48 via at least one pneumatic duct 50, also referred to as an air duct, and led to point S and, in particular, introduced into the exhaust tract 28 at point S. The dashed arrows in the Figures symbolize the path of the compressed air from the piston compressor 68 to the point S. By means of the air duct, for example, the air is taken from the tank 48 and introduced into exhaust tract 28 via a supercritical throttle 52 of the device 46, for example. The duct 50 can be blocked and released by means of a valve 54, for example. In other words, the valve 54 is located, for example in the duct 50 and can be set between a closed position closing the duct 50 and at least or exactly one open position releasing the duct 50. The valve 54 is thus designed as a black-and-white valve, for example, by means of which the release of the secondary air can be switched. The release of the secondary air is thus switched by means of the valve 54, which is designed as a pneumatic valve, and is carried out in particular synchronously with the change in the engine lambda.

The device 46 further comprises a pressure sensor 56 arranged, for example, in the duct 50, by means of which a pressure of the secondary air in the duct 50 and thus upstream of the point S, for example, is detected. The pressure sensor 56 provides, for example, at least one signal, which is in particular electrical, which characterises the pressure detected by means of the pressure sensor 56. In particular, the pressure sensor 56 can be used to determine exactly the quantity or mass of the secondary air that is introduced into the exhaust tract 28. Furthermore, the device 46 comprises a temperature sensor 58, by means of which a temperature of the secondary air in the duct 50 is detected. The temperature sensor 58 provides, for example, at least one signal, which is in particular electrical, which characterises the temperature of the secondary air in the duct 50, as detected by means of the temperature sensor 58. By means of the temperature sensor 58, the device 46, also referred to as the air system, is monitored, for example for leakages. In addition, the temperature sensor 58 is used, for example, to carry out on-board diagnostics (OBD).

Furthermore, a further temperature sensor 60 is provided in the exhaust tract 28 downstream of the main catalytic converter, by means of which temperature sensor, for example, a temperature prevailing in the exhaust tract 28 downstream of the main catalytic converter, in particular of the exhaust gas, is detected. The temperature sensor 60 provides, for example, at least one signal, which is in particular electrical, which characterises the temperature detected by the temperature sensor 60.

It can be seen from FIG. 1 that, for example, an electronic calculating device, also referred to as a control unit 62, is provided which, for example, receives the respective signals and, for example, operates the valve 54 in particular depending on at least one of the signals, depending on at least two of the signals and depending on the aforementioned signals. In this way, for example, the valve 54 is moved between the closed position and the open position by means of the control unit 62 depending on the aforementioned signals. Furthermore, the temperature sensor 60 can be used for on-board diagnostics, for example to monitor temperatures prevailing in the main catalytic converter. In this way, a fault with regard to the combustion air ratio can be detected.

The quantity of secondary air is determined by pressure measurement. i.e., depending on the pressure detected by the pressure sensor 56. Furthermore, the quantity or mass of the secondary is determined, for example, by the appropriate design of the throttle 52. In the supercritical range, the mass or quantity of the secondary air is proportional to its pressure, which makes it possible to determine the air quantity or air mass precisely.

Figure 3:
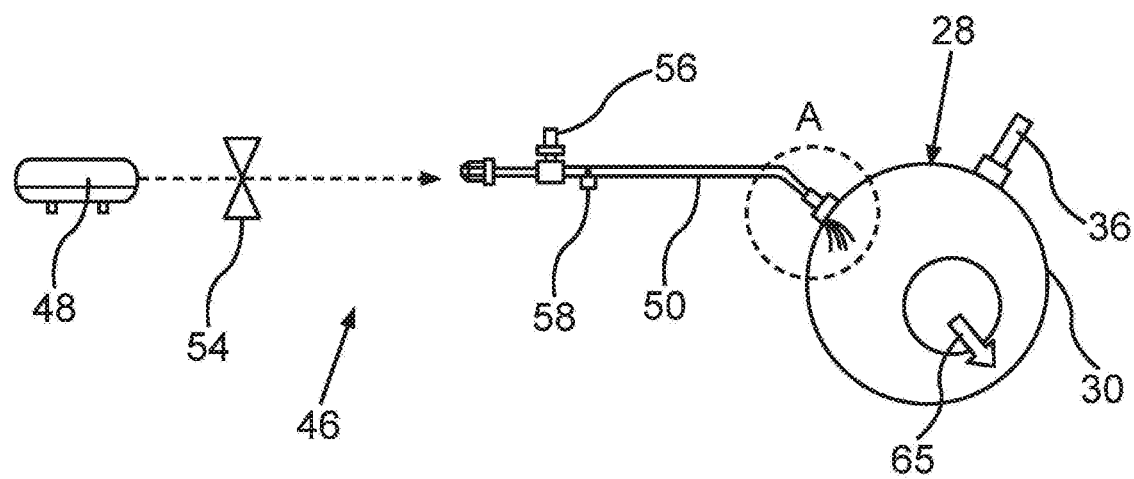
FIG. 3 is a schematic depiction of a device for secondary air injection.
Figure 4:
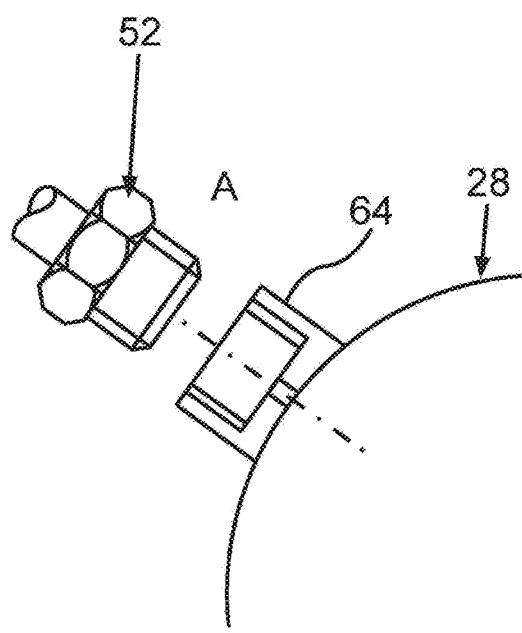
FIG. 4 in sections, is a schematic depiction of a device according to FIG. 3.

The pre-catalytic converter and the air metering system are preferably designed to be attached to the engine, which can be seen from FIG. 3, for example. In FIG. 3, an arrow 65 illustrates the exhaust gas or its flow. Furthermore, FIG. 4 shows the device 46 in a region marked A in FIG. 3. The duct 50, for example, is dimensionally stable or inherently rigid, wherein, for example, the pressure sensor 56 and the temperature sensor 58 are held on the exhaust tract 28, in particular via the inherently rigid or dimensionally stable duct 50. Due to the design attached to the engine, the sensors and any actuators can be connected to an engine cable harness over a short distance. Leakages between the throttle connector and the pressure sensor 56 can thus be at least almost eliminated.

It can be seen from FIG. 4 that the throttle 52 is connected to the exhaust tract 28 via a corresponding throttle connector 64, for example. The throttle 52 is thus to be designed for the necessary air flow, for example. This results in particular from the necessary temperature rise, i.e., the desired temperature increase and the pressure in the tank 48, also referred to as the pressure tank or vehicle pressure tank.

Figure 5:
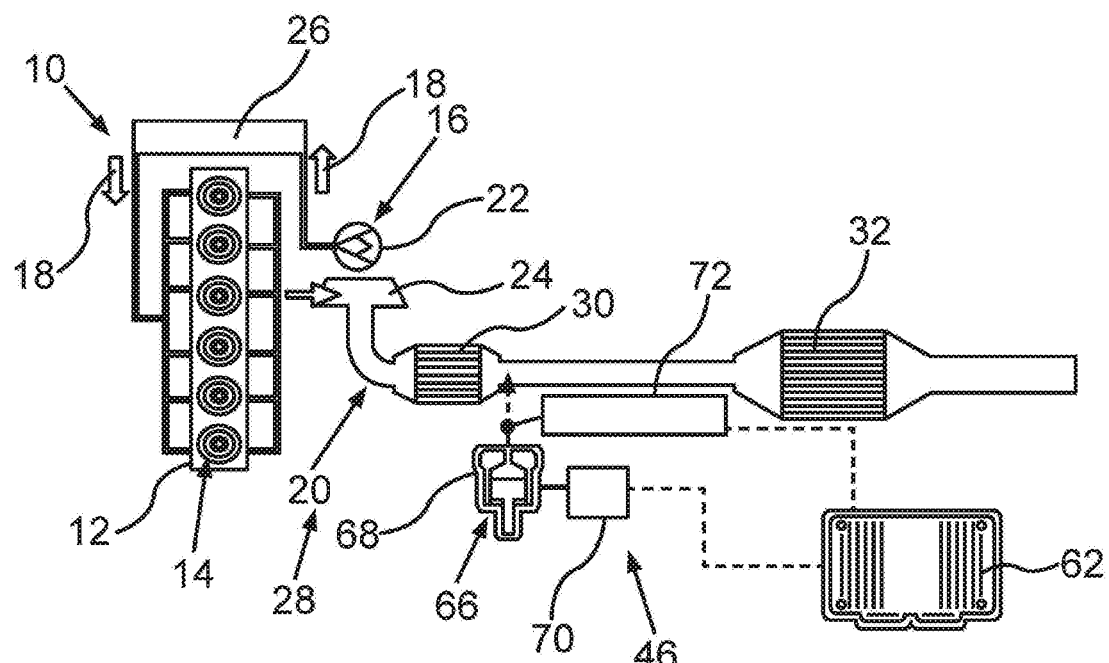
FIG. 5 is a schematic depiction of the petrol engine according to a second embodiment.

FIG. 5 shows a second embodiment in which an electric pump 66 is used to convey the secondary air, in particular through the duct 50, and to introduce it into the exhaust tract 28. The pump 66, which functions as an electric secondary air pump, comprises a compressor 68, which is designed as a piston compressor, for example, and an electric motor 70, by means of which the compressor 68 can be electrically driven or is electrically driven. In addition, an air mass sensor 72 is provided, for example, by means of which the quantity of secondary air which is introduced, in particular conveyed, into the exhaust tract 28 at the point S by means of the electric pump 66 can be detected or is detected. In this way, the quantity of secondary air can be set exactly via the speed of the pump 66, in particular of the electric engine 70, in particular by means of the control unit 62. An additional determination or detection of the quantity of secondary air, also referred to as secondary air mass or secondary air quantity, is optionally possible and is not absolutely necessary if the pump 66 is sufficiently accurate.

Figure 6:
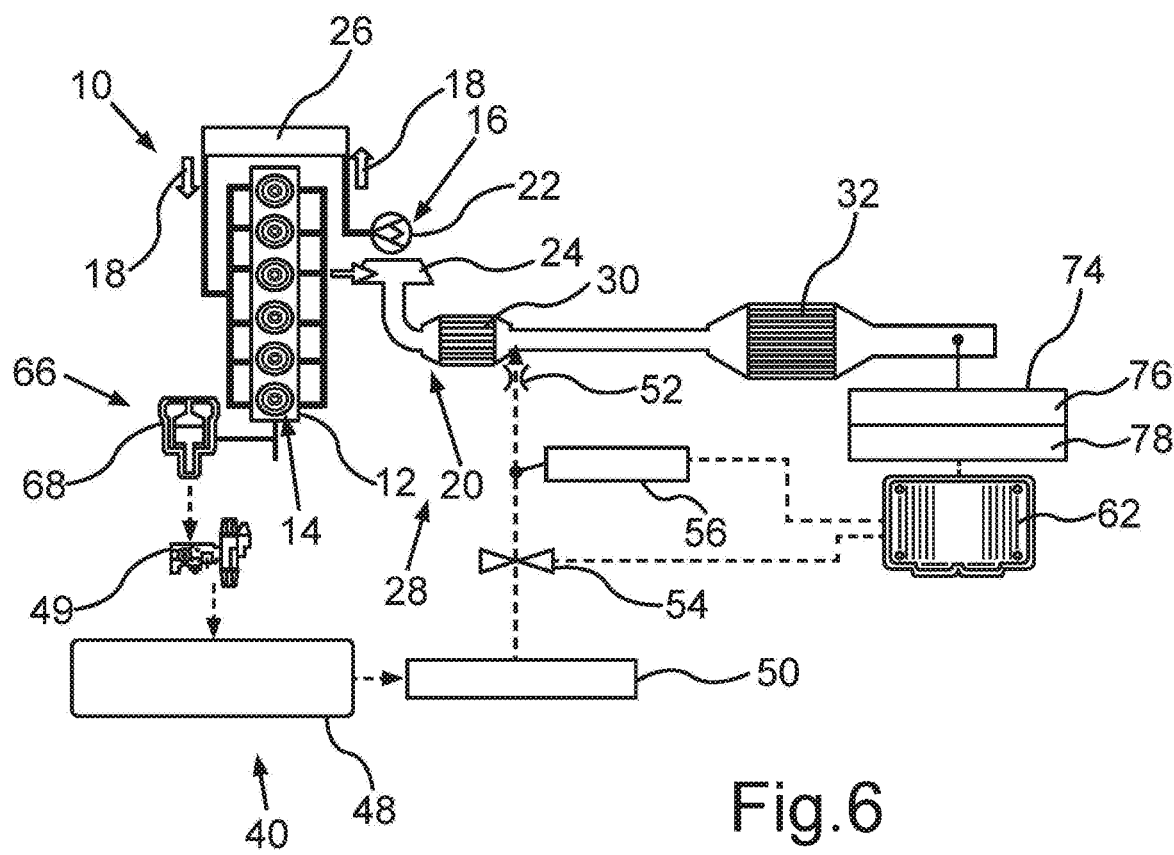
FIG. 6 is a schematic depiction of the petrol engine according to a third embodiment.

FIG. 6 shows a third embodiment, in which the temperature sensors 58 and 60 of the device 46 or the exhaust tract 28 are replaced by a sensor device 74. The sensor device 74 comprises, for example, at least one lambda probe 76 and/or a nitrogen oxide sensor 78, which is also referred to as a $NO_x$ sensor. The lambda probe 76 or the nitrogen oxide sensor 78 is arranged downstream of the main catalytic converter, wherein a residual oxygen content in the exhaust gas downstream of the main catalytic converter can be detected or is detected by means of the lambda probe 76. The lambda probe 76 thus provides, for example, an in particular electrical signal which characterises the residual oxygen content detected by means of the lambda probe 76 and thus, for example, at least one residual oxygen value which in turn characterises the residual oxygen content in the exhaust gas detected by means of the lambda probe 76. Any nitrogen oxides ($NO_x$) contained in the exhaust gas downstream of the main catalytic converter are detected by means of the nitrogen oxide sensor 78. The nitrogen oxide sensor 78 provides, for example, at least one signal, which is in particular electrical, which characterises the nitrogen oxides detected by means of the nitrogen oxide sensor 78 and thus at least one nitrogen oxide value which in turn characterises the nitrogen oxides detected by means of the nitrogen oxide 78. The lambda probe 76, for example, is an in particular additional jump sensor, in particular on the control unit 62. Subsequently, for example, a further output stage is provided for a temperature setting, in particular temperature control, as is, for example, a processor for evaluation. Alternatively or additionally, the in particular second combustion air ratio can be easily integrated into the control unit 62 via available nitrogen oxide sensors via CAN interfaces (CAN—controller area network). The nitrogen oxides sensor 78 detects, for example, a residual oxygen content in the exhaust gas after the main catalytic converter and provides the residual oxygen content in the exhaust gas detected by means of the nitrogen oxide sensor 78. In addition, the nitrogen oxide sensor 78, for example, detects the nitrogen oxides, since the technology for detecting the nitrogen oxides is based on the technology for detecting the residual oxygen content. In this way, a closed control in stationary operation is possible and any faults in the secondary air supply can be corrected or detected.

Figure 7:
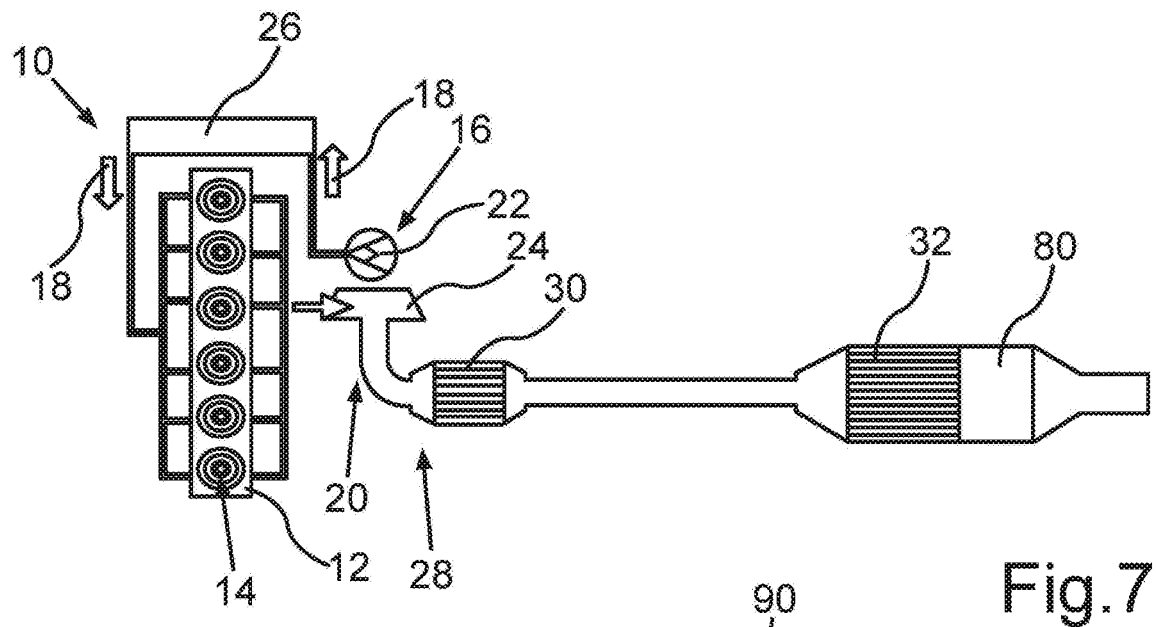
FIG. 7 is a schematic depiction of the internal combustion engine according to a fourth embodiment.

In the described manner, a strong temperature increase in the main catalytic converter can be implemented, wherein this temperature increase is also referred to as the aforementioned temperature rise and results from the fact that the secondary air reacts or combusts exothermically with the uncombusted fuel contained in the exhaust tract 28. This creates advantageous conditions for the regeneration of a particulate filter 80, in particular one downstream of the main catalytic converter. FIG. 7 shows a fourth embodiment in which the particulate filter 80 is arranged downstream of the main catalytic converter. By way of example, the main catalytic converter and the particulate filter 80 are arranged in a common housing. Due to the temperature increase in the exhaust tract 28 that can be implemented by means of the uncombusted fuel and the secondary air injection, the main catalytic converter can be desulphurized, for example, and the particulate filter 80 can be regenerated. To regenerate the particulate filter 80, for example, temperatures of around 600 degrees Celsius or more are necessary or sufficient, wherein such temperatures can be implemented in a regeneration mode due to the secondary air injection. In this way, the particular filter 80 can be regenerated using oxygen. The oxygen used to regenerate the particulate filter 80 can be made available by an overrun cut-off in driving operation, such that, for example, oil and soot residues can be burnt off in the particulate filter 80.

Figure 8:
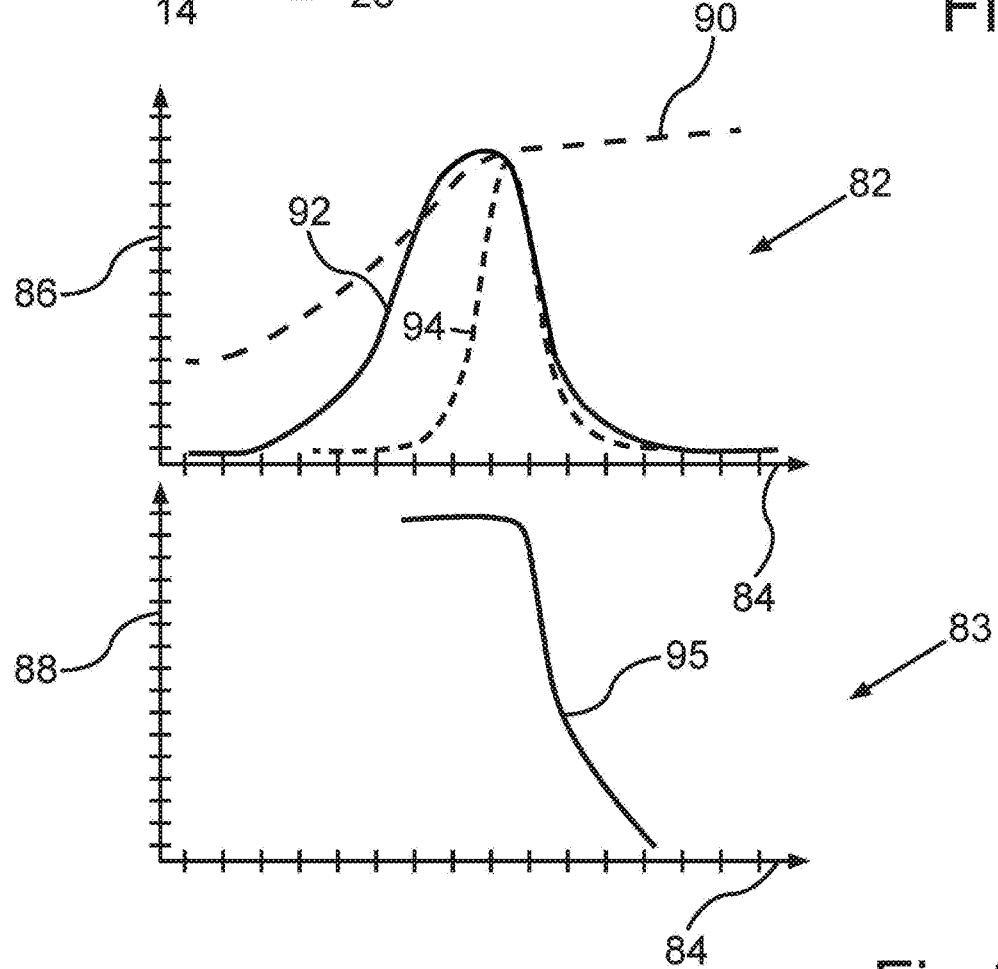
FIG. 8 are diagrams illustrating the method.
Figure 9:
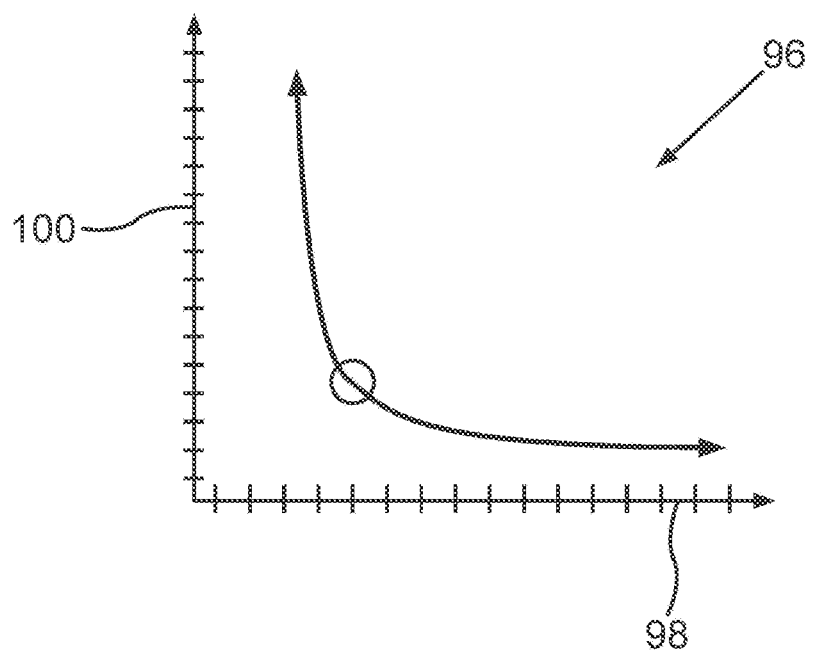
FIG. 9 is a further diagram illustrating the method.

Alternatively or additionally, the nitrogen oxide sensor 78, for example, offers the possibility of monitoring a so-called conversion window or a conversion region within which, for example, the main catalytic converter is desulphurized, correcting the first combustion air ratio and/or the second combustion air ratio and controlling the emissions. This is illustrated, for example, in FIGS. 8 and 9. FIG. 8 shows diagrams 83 and 84, the combustion air ratio being plotted on their respective abscissa 84. On the ordinate 68, uncombusted hydrocarbons or methane are plotted, wherein nitrogen oxides are plotted on the ordinate 88. The methane, the uncombusted hydrocarbons or the nitrogen oxides are contained in the exhaust gas, for example. A course 90 illustrates, for example, the uncombusted hydrocarbons over the combustion air ratio, wherein a course 92 illustrates a conversion window of the main catalytic converter and its new condition, for example. A course 94 illustrates the conversion window of the main catalytic converter in its aged state. Thus it can be seen from FIG. 8 that the conversion window is reduced by ageing of the main catalytic converter. Furthermore, the conversion window, in which the main catalytic converter can be desulphurized, for example, becomes smaller due to increasing sulphurization. The advantageous lambda is thereby slightly shifted to be poor. The tolerance of the sensors leads to an increased variance in the CH4-NOx trade, as can be seen in FIG. 9. A course 95 in FIG. 8 thus illustrates the nitrogen oxides over the combustion air ratio.

Finally, FIG. 9 shows a diagram 96, on the abscissa 98 of which the ratio of $CH_4$ (methane) to uncombusted hydrocarbons (HC) is plotted. Furthermore, the nitrogen oxide content in the exhaust gas is plotted on the ordinate 100. The conversion of other hydrocarbons is also worse in richer lambda operation and should be avoided. With an additional nitrogen oxide sensor, a nitrogen oxide increase can be detected, and the lambda control can be shifted close to the lambda 1 limit. This occurs by correcting the jump sensor voltage and fine tuning the lambda 1 mixture. In this way, a robust control close to lambda=1 and within the ideal conversion window is constantly possible, whereby a minimum of $CH_4$/HC and nitrogen oxide can be achieved across the lifetime.

The invention claimed is:

1. A method for operating a petrol engine, comprising the steps of:
    filling a pressure tank with air and storing the air in the pressure tank;
    introducing air from the pressure tank into an exhaust tract via an air duct that is different from the exhaust tract and that fluidically connects the pressure tank and the exhaust tract through which exhaust gas from the petrol engine flows, wherein the air is introduced into the exhaust tract at a point disposed downstream of a first three-way catalytic converter disposed in the exhaust tract and upstream of a second three-way catalytic converter disposed in the exhaust tract downstream of the first three-way catalytic converter, while the petrol engine is operated with a sub-stoichiometric combustion air ratio whereby desulphurization of the second three-way catalytic converter is caused;
    detecting, by way of a temperature sensor located downstream of a valve to block and release the air duct and upstream of a supercritical throttle to introduce air taken from the pressure tank into the exhaust tract, a temperature of the air in the air duct passing from the pressure tank to the exhaust tract; and
    setting a quantity of air to be introduced into the exhaust tract depending on the detected temperature.

2. The method according to claim 1 further comprising the steps of:
    determining a degree of sulphurization of the second three-way catalytic converter characterizing a quantity of sulphur contained in the second three-way catalytic converter; and
    setting a duration during which the air is introduced into the exhaust tract for desulphurization of the second three-way catalytic converter and the petrol engine is operated sub-stoichiometrically depending on the determined degree of sulphurization.

3. The method according to claim 1, wherein a stoichiometric combustion air ratio is set in the exhaust tract downstream of the first three-way catalytic converter and upstream of the second three-way catalytic converter due to the introduction of the air.

4. The method according to claim 1 further comprising the steps of:
    determining a quantity of air which is introduced into the petrol engine and a quantity of fuel introduced into the petrol engine; and
    setting a combustion air ratio with which the petrol engine is operated depending on the determined quantity of air and quantity of fuel.

5. The method according to claim 4 further comprising the steps of:
    detecting by a lambda probe disposed upstream of the first three-way catalytic converter a value characterizing a residual oxygen content in the exhaust gas; and
    correcting the set combustion air ratio depending on the detected value characterizing the residual oxygen content in the exhaust gas.

6. The method according to claim 1 further comprising the steps of:
    detecting by a lambda probe disposed downstream of the second three-way catalytic converter and/or by a nitrogen oxide sensor disposed downstream of the second three-way catalytic converter a residual oxygen value characterizing a residual oxygen content in the exhaust gas; and
    setting the quantity of air to be introduced into the exhaust tract depending on the detected residual oxygen value.

7. The method according to claim 1 further comprising the steps of:
    detecting by a nitrogen oxide sensor disposed downstream of the second three-way catalytic converter a nitrogen oxide value characterizing a nitrogen oxide content in the exhaust gas; and
    setting the quantity of air to be introduced into the exhaust tract depending on the detected nitrogen oxide value.

8. The method according to claim 1, wherein for the desulphurization, a temperature of at least 600 degrees Celsius is effected in the second three-way catalytic converter.

9. A motor vehicle which is configured to perform the method according to claim 1.

* * * * *